Dec. 6, 1927.
H. T. WEEKS
1,651,652
CLIP OR SUPPORT FOR HORTICULTURAL AND OTHER LABELS
Filed April 19, 1926   3 Sheets-Sheet 1
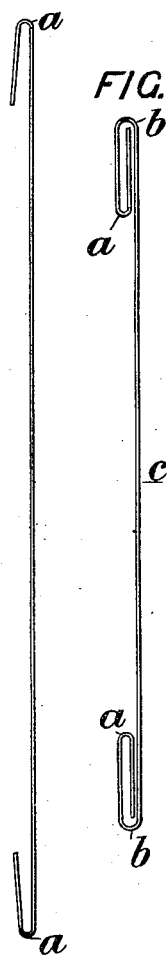
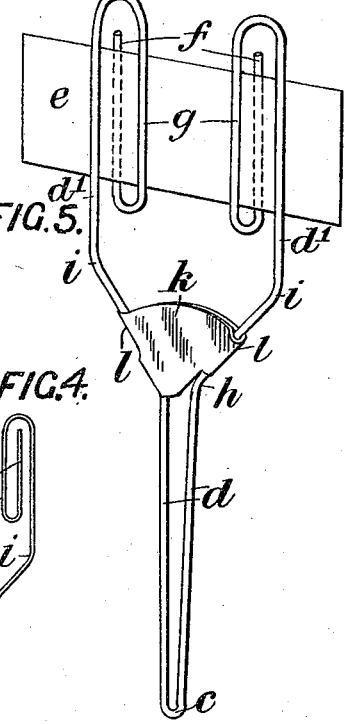
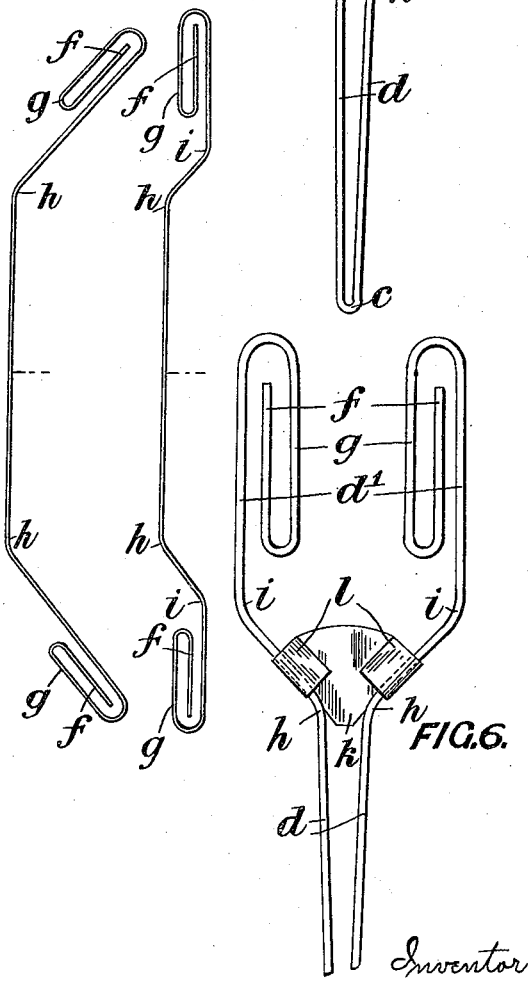
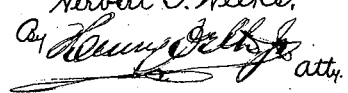

Dec. 6, 1927.
H. T. WEEKS
1,651,652
CLIP OR SUPPORT FOR HORTICULTURAL AND OTHER LABELS
Filed April 19, 1926    3 Sheets-Sheet 2
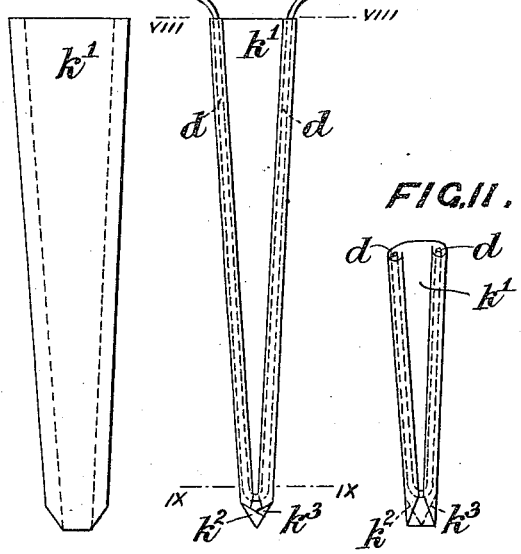

Dec. 6, 1927. 1,651,652
H. T. WEEKS
CLIP OR SUPPORT FOR HORTICULTURAL AND OTHER LABELS
Filed April 19, 1926   3 Sheets-Sheet 3
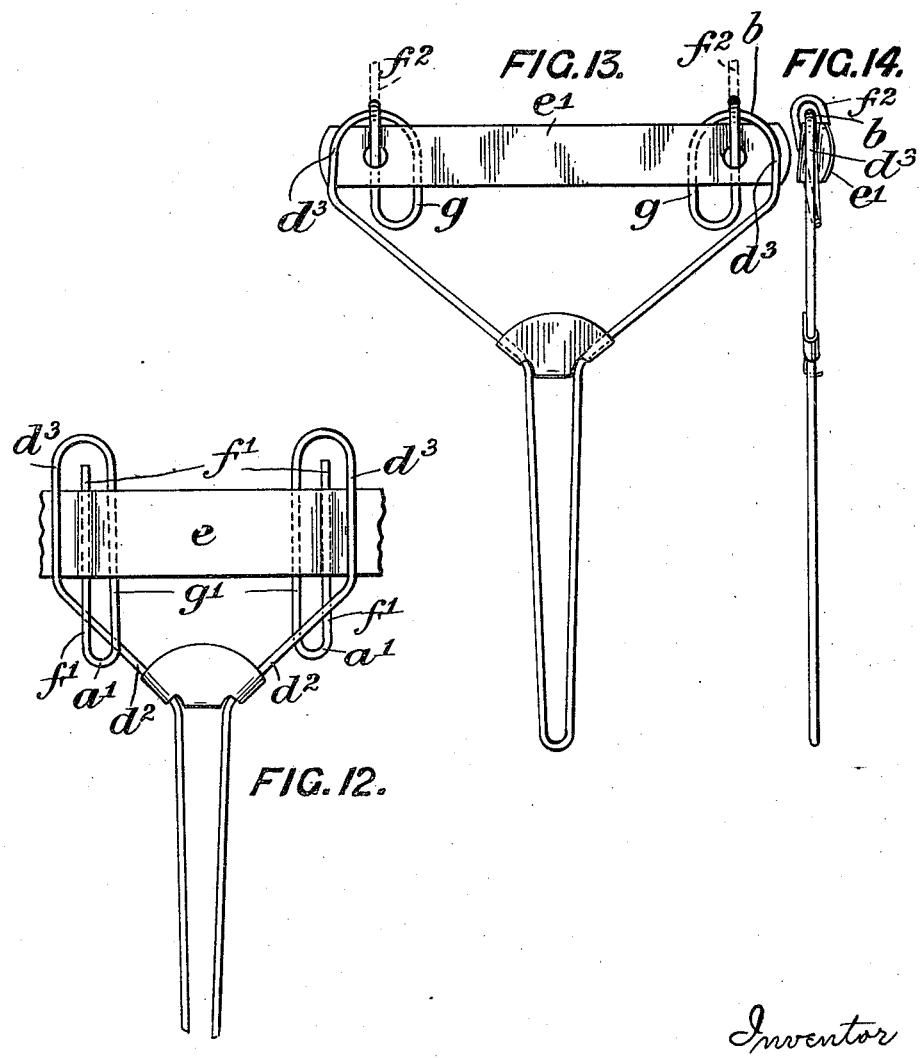

Patented Dec. 6, 1927.

1,651,652

UNITED STATES PATENT OFFICE.

HERBERT THOMAS WEEKS, OF TUNBRIDGE WELLS, ENGLAND.

CLIP OR SUPPORT FOR HORTICULTURAL AND OTHER LABELS.

Application filed April 19, 1926, Serial No. 103,002, and in Great Britain May 28, 1925.

This invention relates to a new or improved clip or support for horticultural and other labels, such clip or support being of the type consisting of wire, bent at one end to form a clip, the other end forming a shank or support, which is adapted to be inserted in the ground or made in the form of a hook or clip for attachment to the branch of a tree or other object.

According to this invention, the clip or support for horticultural and other labels comprises a piece of wire bent at or near the middle to form two substantially parallel shank-members, the end of which is adapted to serve as a stake, clip or hook, and the wire near each end is formed with a series of U-bends, bent into the shape of an elongated coil or coils forming clips to engage the label. If the support is to be inserted in the ground, it is preferably bent more or less acutely so as to form a pointed stake which may be readily forced into the soil. The shank-members are preferably bent outwardly and inwardly near the clips to separate the coils and prevent the label from slipping down on one side or the other as they are liable to do if the clips are too close together. The holder is also made more rigid by connecting two shank members near the clips by a piece of sheet metal or the like.

And in order that the invention may be readily understood, reference will be made to the accompanying drawings, in which:—

Figure 1 is an elevation of a length of wire showing the first bend in the manufacture of a support for a label constructed according to this invention.

Figure 2 is a similar view showing the wire bent to form part of two clips, and

Figures 3 and 4 are elevations showing different stages in the manufacture of a modification of label support.

Figure 5 is a front perspective view of the same modification, and

Figure 6 is a rear elevation thereof.

Figure 7 is an elevation of a slightly modified construction of label-support.

Figure 8 is a section on the line VIII—VIII, Figure 7 to an enlarged scale.

Figure 9 is a section on the line IX—IX, Figure 7, also to an enlarged scale.

Figure 10 is an elevation of a blank of the reinforcing or stiffening device for the shank parts of the support and Figure 11 is a perspective view of a part of the reinforcing blank partly folded and enclosing the shank parts.

Figure 12 is a front elevation of another modification.

Figure 13 is a front elevation of yet another modification, and

Figure 14 is a side view thereof.

In carrying the invention into effect and according to the construction shown in Figures 1 and 2, a length of straight wire is bent or returned at each end inwards at $a$ towards each other so that the bent over piece or hook at each end is substantially parallel to the straight wire. These bent over or returned ends are again bent towards each other as shown in Figure 2 at $b$ so as to produce an elongated oval of wire nearly complete except that it is open where the wire terminates near the first bend. Or, if desired, the first bends may be made at $b$ and the second bends at $a$. The straight and intermediate portion of the wire is then bent acutely at about the middle of its length at $c$ to form a blunt pointed shank $d$ as shown in Figure 5 and the incomplete ovals or loops are then relatively close together and in the same plane.

As shown in Figures 3 and 4, the blank or wire, formed at each end with the incomplete ovals or elongated loops $f$ $g$, is bent outwards at $h$ (Figure 3) at an obtuse angle and again bent a short distance away from these first bends, namely, at $i$ (Figure 4) in the opposite direction. The straight portion of the wire is then bent acutely in the middle at $c$ so that the two shank portions are substantially parallel and the ovals $f$ $g$, are relatively close together as aforesaid and say, about one inch apart. Any substantially stiff label $e$ may be used with clips or supports of this construction and is readily passed between the upstanding portion $f$ and the shank $d$ at each side of the shank as shown in Figure 3, there being sufficient elasticity in the wire or the label to permit this to take place, or between one loop member and the upstanding portion $f$. If desired, and as shown in Figures 5 and 6, two sides of the wire label support may be connected by a quadrant-shaped clip $k$ made of sheet metal having lugs $l$ each of which is bent round a wire member. In this example, the label $e$ (Figure 5) is clipped in front by the parts $d'$ and $g$ and behind by the upstanding parts $f$. Instead of being straight, the members *d d* may be bent to form a hook, loop or clip.

Or, as shown in Figures 7, 8, 9, 10 and 11 and to avoid using unduly thick wire to impart the necessary stiffness to the shank or stake, the shank-members or parts *d* are connected and stiffened by a substantially triangular piece of metal *k'* (Figure 10) of thin sheet zinc or other suitable material, the lateral edges of which are bent or wrapped round the shank parts *d* as shown in Figure 11, after which the partly folded and partly unfolded parts at each lower corner are bent, one over the other, along the dotted lines $k^2$ and $k^3$ (Figure 11) thus forming a stiff and strong point as shown in Figure 7.

As shown in Figure 12, the parts *g'* and *f'* are made rather longer than shown, for example in Figures 5, 6 and 7, so that the bends *a'* pass down below the intermediate parts $d^2$. The label *e* is introduced, for example, as shown on the right hand side of the Figure 12, by passing it behind the part $d^3$ and in front of the parts *f'* and *g'* while the bends *a'* are behind the intermediate parts $d^2$ and then, as shown on the left hand side of the figure, the bends *a'* are pushed in front of the parts $d^2$, thus increasing the pressure on the label *e* and improving the locking quality of the support.

The labels may be made of non-corrodible metal such as zinc or aluminium alloy or they may be made of wood, celluloid or other appropriate material.

In all the foregoing constructions and particularly where a thin and more or less flexible or elastic label is inserted in the support as shown in Figures 5 or 12, for example the label is practically secured against accidental displacement inwardly, outwardly, upwardly and downwardly but if it be desired to positively lock as well as clip the label, the construction may be modified as shown in Figures 13 and 14. In this case, each upstanding member $f^2$ is made somewhat longer than in the other constructions so as to enable it to be bent over the top of the bend *b*. This may be done in the course of manufacture and in that case the labels are inserted as previously described. Or, as shown in dotted lines in Figure 13, the support is solid with the upstanding parts $f^2$ extending above the bends *b* and a label *e'* with a perforation near each end is employed. The label is, for example, inserted behind the parts $d^3$ and in front of the parts *g* with the upstanding parts $f^2$ projecting through the holes in the label. When the label is thus put in position, the upper extensions of the parts are bent over the bends *b* and the label is absolutely locked against removal in all directions.

I claim:—

1. A wire clip for holding horticultural and other labels comprising a piece of wire, bent to form a shank consisting of two substantially parallel shank-members, each shank member bent outwardly to form diverging portions and at a short interval bent wardly to form parallel members and bent at its free end to form a plurality of oppositely disposed elongated loops constituting a clip having parallel constituent parts, one loop extending across its adjacent diverging portion of the shank and a piece of sheet metal having a lateral extension on each side bent round a diverging portion of a shank member in order to secure together the said shank-members.

2. A wire clip, for holding horticultural and other labels, comprising a piece of wire, bent to form a shank consisting of two substantially parallel shank-members, each shank-member bent outwardly to form diverging portions, at a short interval bent inwardly to form parallel members and bent inwardly at its free end to form a plurality of oppositely elongated loops constituting a clip having substantially parallel constituent parts, one loop extending across its adjacent diverging portion of the shank, and means for rigidly connecting the shank portions.

3. A wire clip for holding horiticultural and other labels comprising a piece of wire, bent to form a shank consisting of two substantially parallel shank-members, each shank-member bent outwardly at an obtuse angle to form diverging portions, at a short interval bent inwardly to form parallel members and bent at its free end to form a plurality of oppositely disposed elongated parallel constituent parts, one loop extending across its adjacent diverging portion of the shank, and a piece of sheet metal bent on each side round a shank member in order to secure the said shank members rigidly together.

4. A wire clip for holding horticultural and other labels comprising a piece of wire bent to form a shank consisting of two substantially parallel shank-members, each shank-member bent outwardly at an obtuse angle to form diverging portions, bent inwardly to form parallel members and bent at its free end to form a plurality of oppositely disposed elongated loops, constituting a clip having parallel constitutent parts, and a piece of sheet metal having a lateral extension on each side bent round a diverging portion of a shank member in order to secure together the said shank-members.

HERBERT THOMAS WEEKS.